Figure 1:
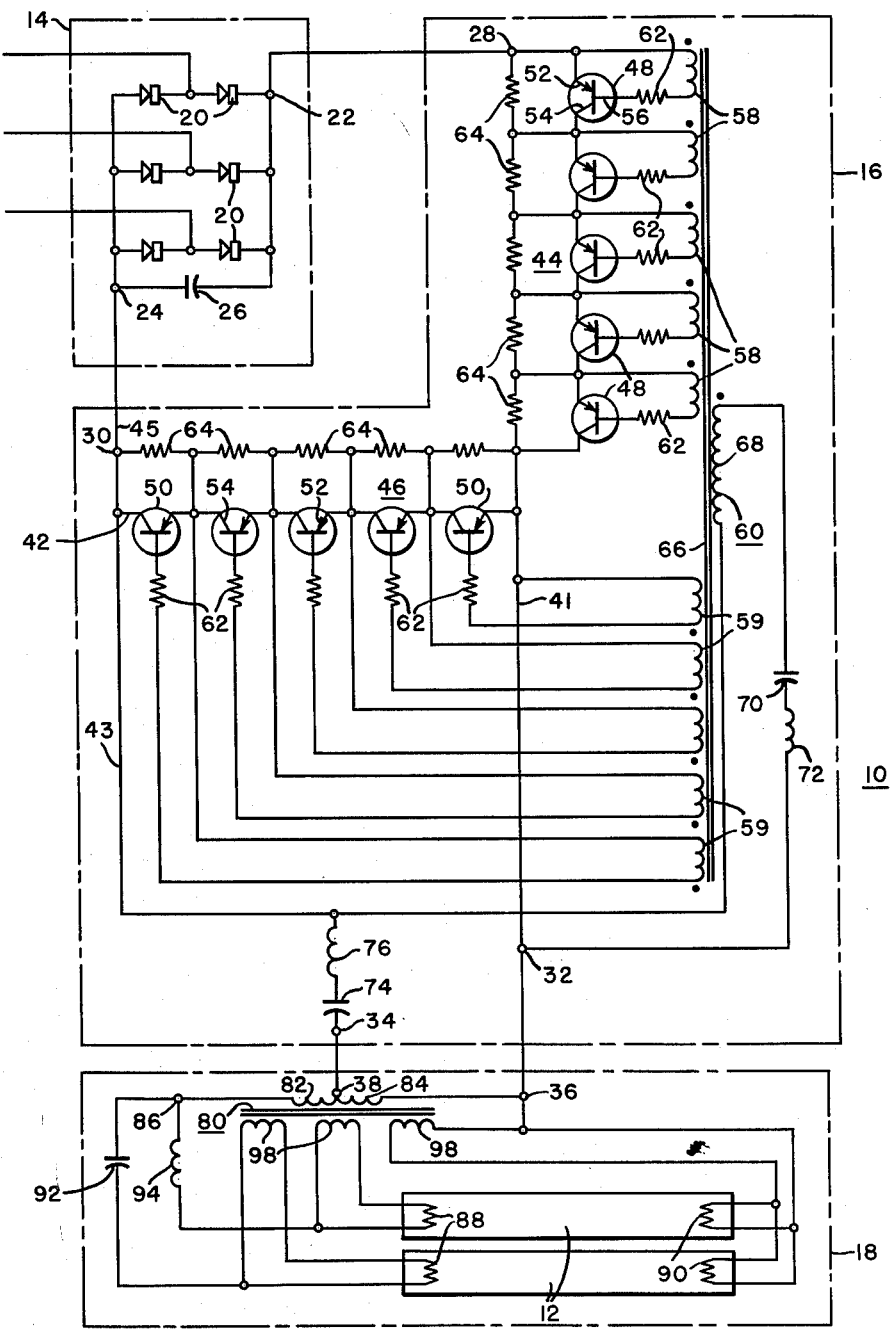

United States Patent Office 2,983,846
Patented May 9, 1961

2,983,846
ELECTRICAL SYSTEM FOR ENERGIZING LOAD APPARATUS

John F. Roesel, Jr., Pittsburgh, and Alfred E. Relation, Plum Township, Allegheny County, Pa., assignors to Westinghouse Electric Corporation, East Pittsburgh, Pa., a corporation of Pennsylvania Filed Aug. 17, 1959, Ser. No. 834,306
17 Claims. (Cl. 315—97)

The present invention relates to electrical systems that can be employed for supplying energy to load apparatus. More particularly, the invention relates to electrical systems that include means for converting the frequency of alternation of supply current to a different frequency of alternation so that the load apparatus can be energized for improved operation.

The combination of circuit elements that is to be employed to form an electrical system for supplying energy to load apparatus can be determined through consideration of numerous factors that are related to achieving desired operational results with optimum operational efficiency. For example, certain types of load apparatus, such as fluorescent lamps, exhibit markedly improved operational efficiency when supplied with energy at a frequency of current alternation other than the standard or 60 cycles per second frequency of current alternation. To energize the type of load apparatus just described, it is, therefore, necessary that the combination of circuit elements used for supplying the energy be arranged so that the energy is delivered to the load apparatus at a frequency of current alternation that provides, for the apparatus, higher operational efficiency at prescribed operative values of current and voltage.

It is, of course, manifest that the gain in the operational efficiency of the load apparatus is not to be offset by an increased loss in the operational efficiency of the combination of circuit elements that energizes the load apparatus relative to the operational efficiency of conventional electrical systems. In fact, it is desirable that the combination be arranged to offer through its own operational characteristics a gain in operational efficiency over that of conventional electrical systems. The preceding general considerations will provide a better perspective of the invention which will subsequently be described more fully.

Thus, it is an object of the invention to provide an arrangement of circuit elements for supplying energy to load apparatus so that the load apparatus is characterized with an elevated operational efficiency.

It is another object of the invention to provide an arrangement of circuit elements that transmits energy with improved efficiency and that supplies this energy to load apparatus at a converted frequency of current alternation to characterize the load apparatus with an elevated operational efficiency.

It is a further object of the invention to provide an arrangement of circuit elements including semiconductor devices for supplying energy to load apparatus with improved energy transfer efficiency and at a converted frequency of current alternation to characterize the load apparatus with improved operational efficiency.

These and other objects of the invention will become more apparent upon consideration of the following detailed description taken along with the attached schematic drawing, in which:

Figure 1 is a schematic diagram of an arrangement of circuit elements, embodied in accordance with the principles of the invention, for supplying energy to load apparatus represented here as a pair of fluorescent lamps.

With regard to the broad aspects of the invention, an arrangement of circuit elements is provided for inverting a unidirectional supply current into an output current that alternates in direction in accordance with a prescribed time function. The frequency of alternation of the output current is different from the frequency of alternation of the supply current and is accorded a value that characterizes load apparatus, that is energized by the output current, with improved operational efficiency for reasons considered previously.

In order to clarify the broad precepts of the invention, an embodiment of the invention, to be described here only for purposes of illustration, is shown schematically in Fig. 1 along with load apparatus in the form of a pair of fluorescent lamps 12. It has been known for some time that fluorescent lamps have an increased operational efficiency when operated at frequencies higher than the conventional frequency of 60 cycles per second. With high frequency operation, the increased operational efficiency of fluorescent lamps appears, for example, in the form of an increased emission of light for a reference amount of delivered energy. The increased efficiency occurs because at higher frequencies the amount of energy that is required for providing an ionized discharge path in the lamps is reduced. It is to be noted, however, that the operational efficiency increases with frequency only up to a frequency of approximately 10,000 cycles per second.

With reference to Fig. 1, a circuit arrangement 10 along with the aforementioned fluorescent lamps 12 is schematically shown in three sections. A first or rectifier section 14 of the circuit arrangement 10 is provided for rectifying the current from a voltage source (not shown) that alternates at the exemplary rate of 60 cycles per second into a unidirectional current for transfer to a second or inverter section 16. It is to be noted that, in modified embodiments of the invention, any arrangement that provides a unidirectional output current of desired value can be used to supply the inverter section 16.

The inverter section 16 of the circuit arrangement 10, being actuated by the unidirectional voltage output of the rectifier section 14, operates in a manner that provides, for a third or ballast and load section 18, a current that alternates at an elevated frequency. Since the inverter section 16 will be described here only to the extent that it is related to the broad combination of the invention, reference for a more thorough description of the inverter section 16 is made to a copending application of J. F. Roesel, Jr., entitled "Electrical Inverter Circuits," filed April 7, 1958, Serial No. 726,934, and assigned to the present assignee.

The voltage source is comprised of three phase voltages for achieving high quality rectification. It is to be expected, therefore, that voltage sources having other phase relationships can be used without departing from the principles of the invention.

To continue with the description of the embodiment of the invention shown in Fig. 1, the rectifier section 14 comprises a standard three-phase, fullwave rectifier which employs six suitably connected diodes 20, or other rectifying devices. Accordingly, the potential difference appearing across output terminals 22, 24 of the rectifier section 14 is substantially constant as a function of time as a consequence of the electrical connections made from the terminals 22, 24 through the diodes 20 to the voltage source. The potential difference between the output terminals 22, 24 of the rectifier section 14 will, however, vary a small amount as a function of time to cause what is known as a ripple to occur in the potential difference across the terminals 22, 24. In this instance, the ripple occurs at a frequency of 360 cycles per second, and its relation to the operation of the circuit arrangement 10 will be referred to subsequently. In addition to the diodes 20, the rectifier section 14 includes a capacitor 26 that is connected across the output terminals 22, 24 to shunt any currents of high frequency from being fed back to the voltage source from the inverter section 16 of the circuit arrangement 10.

The inverter section 16 is provided with a pair of input terminals 28, 30 that are respectively connected to the output terminals 22, 24 of the rectifier section 14, and a pair of output terminals 32, 34 for connection to input terminals 36, 38 of the ballast and load section 18. In substance, the inverter section 16 operates as means for periodically switching the application of the potential difference appearing across the output terminals 22, 24 of the rectifier section 14 to the ballast and load section 18 of the circuit arrangement 10. The periodic switching just mentioned causes a current to flow through the output terminals 32, 34 of the inverter section 16 to the ballast and load section 18 in alternating directions with a frequency determined by certain parameters of the circuit arrangement 10.

More specifically, in order to provide for an alternation of current flow through the output terminals 32, 34 the inverter section 16 includes a pair of electrical paths 40, 42. The path 40 includes in series the rectifier section 14, including its output terminals 22, 24, switching means 44, conductor 41, the input terminals 36, 38 of the ballast and load section 18, and conductors 43 and 45. The path 42 includes in series switching means 46, a conductor 43, the input terminals 38, 36 of the ballast and load section 18 and a conductor 41. For reasons to be set forth subsequently, the switching means 44, 46 alternately establish and interrupt the paths 40, 42, respectively, to alternate the direction of current flow through the ballast and load section 18 of the circuit arrangement 10.

In the illustrative embodiment of the invention being described here, the switching means 44, 46, respectively, include a number of serially connected semiconductor elements 48, 50 such as transistors. Since the relatively high unidirectional potential difference across the output terminals 22, 24 of the rectifier section 14 is impressed across each of the switching means 44, 46 at various times during the operation of the circuit arrangement 10, the number of semiconductor elements or transistors 48, 50 that are serially connected to form each of the switching means 44, 46 is dependent upon the voltage rating of the individual transistors 48, 50. Although extensive research efforts are presently being undertaken to construct transistors or similar devices for operation at higher voltages, a number of transistors, as just indicated, can be serially connected so that the individual voltage ratings of the transistors are additive to provide an overall voltage rating of elevated value. When transistor or similar devices having elevated voltage ratings become realized, it is to be expected that one or more such transistors will be operable in the manner that the serially connected transistors 48, 50 operate here.

Each of the illustrated transistors 48, 50 is provided with an emitter electrode 52, a collector electrode 54, and a base electrode 56. Since the emitter and collector electrodes 52, 54 of the transistors 48 are serially connected in the current path 40, whether current flows in the path 40 depends upon whether a conductive condition exists between the emitter and collector electrodes 52, 54. Similarly, the emitter and collector electrodes 52, 54 of the transistors 50 are serially connected to determine whether current flows in the current path 42. The relationships just generally described provide switching action for the switching means 44, 46 of the inverter section 16.

In order to control the condition of conductivity between the emitter and collector electrodes 52, 54 of each transistor 48 or 50, a secondary winding 58 or 59, respectively, of a transformer 60 is serially connected in the base-emitter circuit of each of the transistors 48 or 50, respectively. A resistance element 62 is desirably but not necessarily connected serially in the base-emitter circuit of each of the transistors 48 or 50 to limit the flow of control current through the associated base-emitter circuit. Another circuit element 64 having a suitable value of resistance is connected in parallel across the emitter and collector electrodes 52, 54 of each of the transistors 48 or 50 to ensure an even distribution of applied voltage across the emitter and collector electrodes 52, 54 thereof particularly when the switching means 44 or 46 is in a nonconductive condition.

Although the transformer 60 is being described here as means for providing the control current that flows in the base-emitter circuit of each of the transistors 48 or 50, respectively, other circuit elements, such as an external current source, serving the same purpose can equally be employed. To continue now with the description of the inverter section 16 of the circuit arrangement 10, the transformer 60 includes a magnetic core 66 which can be constructed of any suitable magnetic material, such as a high permeability silicon steel, and which is designed in an ordinary manner so as not to saturate during operation of the inverter section 16.

Additionally, a primary winding 68 is provided for the transformer 60. When the value of current flowing through the primary winding 68 is caused to change, a potential difference appears across each of the secondary windings 58 and 59 through electromagnetic induction to control the flow of current through the base-emitter circuit of each transistor 48 or 50.

With reference to the well known relationship in the art of semiconductor technology that the polarity of the bias voltage applied between the emitter and base electrodes of a transistor determines whether a base-emitter current flows to control the aforementioned condition of conductivity between the emitter and collector electrodes, it follows that by periodically reversing the polarity of the bias voltage between the emitter and base electrodes 52, 56, the condition of conductivity between the collector and emitter electrodes 54, 52 can be alternated between one which is fully conductive and one which is fully nonconductive. Provision is therefore made for making the switching means 44, 46, and, accordingly, the paths 40, 42 alternately conductive so that the current through the ballast and load section 18 of the circuit arrangement 10 alternates in direction of flow.

From what has just been set forth, it follows that the condition of conductivity of the paths 40, 42 can be controlled through periodic changes in the current of the primary winding 68 to effect a periodic reversal of the polarity of the bias voltage applied between the emitter and base electrodes 52, 56 of the transistors 48, 50, respectively. To afford the latter control provision with use of inherent parameters of the circuit arrangement 10, a serial combination of the transformer primary winding 68 and control means, in the form of a serial capacitor 70 and an inductor 72, is connected in parallel with the switching means 46 and in series with the rectifier section 14 and the switching means 44. However, as described more fully in the aforementioned copending application, the control means can comprise other arrangements of circuit elements, such as a single capacitor or an external control device. In addition to the circuit elements thus far described, the inverter section 16 also includes a serial combination of a capacitor 74 and an inductor 76 that is common to each of the paths 40, 42 for purposes to be noted subsequently.

The operation of the inverter section 16 of the circuit arrangement 10 will now be described. When the aforementioned voltage source is connected to the rectifier section 14, as with the use of any convenient switching arrangement (not shown), a potential difference appears across the switch means 44 and the transformer primary winding 68 of the inverter section 16 to actuate the switch means 44 toward a conductive condition. Current from the voltage source then begins to flow through the output terminal 22 of the rectifier section 14, along the path 40 including the ballast and load section 18 and increasingly through the primary winding 68 of the transformer 60 to the output terminal 24 of the rectifier section 14. The voltage induced in each of the secondary windings 58 as a result of the increasing flow of current in the primary winding 68 is polarized, as indicated in Fig. 1, to cause a base-emitter or control current to flow in each of the transistors 48, thereby causing the condition of conductivity between the emitter and collector electrodes 52, 54 of each of the transistors 48 to become more conductive.

On the other hand, the voltage induced in each of the secondary windings 59 is polarized, as indicated in Fig. 1, to prevent the flow of base-emitter current in each of the transistors 50, thereby causing the condition of conductivity between the collector and emitter electrodes 52, 54 of each of the transistors 50 to become more nonconductive. The current through the switch means 44 and along the path 40 continues to flow thereby charging the capacitor 74 which, as noted before, is serially connected in the path 42. Additionally, the current through the primary winding 68 of the transformer 60 continues to flow thereby charging the capacitor 70. When the capacitor 70 is charged to a value of voltage so that the flow of current through the transformer primary winding 68 decreases toward a zero value, each of the transistors 48 of the switch means 44 is driven toward a nonconductive condition.

When the switch means 44 has been driven to a sufficiently nonconductive condition, the current in the path 40 is cut off and the voltage drop across the switch means 44 relative to the source voltage, is sufficient to permit the charged value of voltage of the capacitor 70 to cause an increasing flow of current through the switch means 46 and through the primary winding 68 of the transformer 60 in a direction that is opposite from the direction of the former current flow through the primary winding 68. The increasing current through the primary winding 68 of the transformer 60 drives the switch means 46 to a more conductive condition and, conversely, the switch means 44 to a more nonconductive condition. With the switch means 46 being actuated to a conductive condition, the capacitor 74, having been charged by the former flow of current in the path 40, then discharges along the path 42 through the ballast and load section 18 and the now conductive switch means 46.

The latter current, flowing in the path 42, passes through the ballast and load section 18 in a direction that is reversed from the direction of the former current through the ballast and load section in the path 40. When the discharge current from the capacitor 74 decreases toward a zero value, the switch means 46 is driven toward a nonconductive condition. Additionally, the switch means 44 is driven from its nonconductive condition toward a conductive condition so that current again begins to flow from the voltage source through the switch means 44 in the path 40 including the ballast and load section 18 and increasingly through the transformer primary winding 68 in a direction opposite from the direction of current flow in the primary winding 68 during the discharge of the capacitors 70, 74. As a consequence, the switch means 44 become more conductive and the switch means 46 becomes more nonconductive until the capacitor 70 is again charged to a value of voltage to cause a decrease in current flow through the primary transformer winding 68 in the manner indicated previously. The operation of the inverter section 16 of the circuit arrangement 10 is one which is cyclic and therefore continues for so long as the voltage source is operatively connected to the circuit arrangement 10. As a result of this operation, it is obvious that the current flowing from the output terminals 32, 34 of the inverter section 16 into the ballast and load section 18 is one which alternates in direction.

The frequency with which the latter current alternates in direction depends upon the capacitance and inductance values accorded to the capacitor 70 and the inductor 72, respectively. Further, it is axiomatic that the frequency at which the reactance values of the inductor 72 and the capacitor 70 are substantially equal in absolute value, is the one at which resonance will occur in the serial combination of the inductor 72 and the capacitor 70. At the resonant frequency, the impedance to current flow in the circuit branch including the transformer primary winding 68 is minimum in value so that stable operation of the inverter section 16 at the resonant frequency is occasioned.

Additionally, the serial combination of the capacitor 74 and the inductor 76, being common to each of the paths 40, 42 can be provided with respective values of capacitance and inductance to establish a resonant frequency for this combination that is equal to the resonant frequency of the serial combination of the capacitor 70 and the inductor 72. Thus, in addition to the capacitor 74 supplying a discharge current flow in the path 42, the combination of the capacitor 74 and inductor 76 can provide a filtering arrangement which only permits passage of an alternating current appearing at the output terminals 32, 34 of the inverter section 16 that corresponds in frequency to the resonant or fundamental frequency of the combination of the capacitor 70 and the inductor 72.

With the provision of this filtering arrangement, the alternating current that is permitted to flow through the ballast and load section 18 substantially has a simple, sinusoidal wave form. Harmonics or other current components, each having a frequency different from that corresponding with the desired output frequency of the inverter 16, would ordinarily flow through the ballast and load section 18 but are prevented from flowing in the illustrative circuit arrangement 10 by the relatively high value of serial impedance offered thereto by the capacitor 74 and the inductor 76. As an added notation, it is to be realized that, by providing a sinusoidal current for the ballast and load section 18, the design characteristics of each component included in the ballast and load section 18 need only be based, in part, upon a single frequency and not a band of frequencies.

In addition to the pair of fluorescent lamps 12, the ballast and load section 18 of the circuit arrangement 10 is provided with means for multiplying the voltage delivered to the input terminals 36, 38 of the ballast and load section 18, and, additionally, means for limiting the flow of current through the fluorescent lamps 12 when actuated to a conductive condition. Here, the multiplying means is in the form of an autotransformer 80 having a primary winding 82 of which a portion 84 is connected across the input terminals 36, 38 of the ballast and load section 18 and of which the entirety is connected to the input terminal 36 and a ballast terminal 86 and thence across the lamps 12 in parallel. Any voltage appearing across the winding 82 is therefore impressed, in this application, across oppositely positioned filaments 88, 90 in each of the lamps 12.

Additionally, a capacitor 92 is connected in series between the terminal 86 and one of the lamps 12 to provide ballast impedance for the same, and an inductor 94 is connected in series between the terminal 86 and the other lamp to provide ballast impedance for the same. The reactance values of the capacitor 92 and the inductor 94 desirably are such that, at the frequency of operation, they have equal absolute values to provide a unity power factor for the fluorescent lamps 12 or other load apparatus, but provide in combination sufficient impedance to limit the overall current flowing from the winding 82 of the autotransformer 80 through the lamps 12. It is also to be noted that the autotransformer 80 is provided with a multiple number of secondary windings 98 for heating the filaments 88, 90 of the fluorescent lamps 12. The fluorescent lamps 12 illustrated here are of the type that is known as rapid-start lamps, but other types, such as the type known as instant-start lamps, can equivalently be used.

As noted previously, a ripple can appear in the unidirectional voltage appearing across the output terminals 22, 24 of the rectifier section 14. In the present embodiment of the invention, the ripple alternates at the rate of 360 cycles per second so that harmonics of the ripple can be transmitted to appear as a voltage fluctuation across the lamps 12. The presence of the ripple across the lamps 12 can become apparent through an oscillation in the intensity of light given off by the lamps 12. The oscillation would occur at a frequency corresponding to the beat frequency of the pertinent harmonic of the ripple and the resonant frequency of the inverter section 16. Thus, by suitable selection of the resonant frequency of the inverter section 16, namely, by selecting a value which produces a beat frequency greater than 60 cycles per second, for example, the oscillation in light intensity can become unobservable.

To indicate further the operating characteristics of the present illustrative embodiment of the invention, several statistics will now be set forth. For example, in the case of a 40 watt rapid-start fluorescent lamp, the overall luminous efficiency for 60 cycle operation is approximately 54 lumens of light energy output per watt of electrical energy input. The same lamp, operated at 1500 cycles per second, for example, results in an overall luminous efficiency of about 63 lumens of light energy output per watt of electrical energy input. The increase in overall efficiency with the higher frequency operation is approximately 15% and comprises approximately an 8% increase in lumen output due to the higher frequency operation and a 7% reduction in energy losses due to the use of the arrangement of circuit elements described here relative to the use of conventional electrical systems in supplying energy to the lamp. A substantial portion of the latter decrease in energy losses arises because the ballast arrangement required for the 1500 cycle operation is comprised of components smaller in size and considerably reduced in weight over conventional ballast arrangements.

The circuit arrangement 10 described herein can be housed with suitable provision for dissipation of energy losses occurring in the form of generated heat during operation of the arrangement 10. One form of such housing is described and claimed in another copending application of A. E. Relation and J. F. Roesel, Jr., entitled "Means For Housing Circuit Arrangements," filed August 17, 1959, Serial No. 834,216, and assigned to the present assignee.

Of course, the inductor 76 and the capacitor 74, instead of being provided in the inverter section 16 of the circuit arrangement 10, can be connected in the input of the ballast and load section 18. With either arrangement of the inductor 76 and the capacitor 74, it is to be recognized that a number of ballast and load sections 18 connected in parallel can be supplied by the inverter section 16 because the output voltage of the inverter section 16 remains substantially constant with output power up to its rated output power, as determined by the current ratings of the transistors 48 and 50.

It is also to be realized that benefits are attained through the use of a semiconductor inverter in the manner described here. For example, frequency conversion is accomplished in a static or noiseless fashion, and the physical size of a unit for housing the illustrative circuit arrangement is minimized. Additionally, durability of operation for the circuit arrangement is provided since maintenance requirements are substantially reduced.

In the foregoing descriptive matter, an arrangement of circuit elements for supplying energy to load apparatus has been described only to illustrate the principles of the invention. It is, therefore, desired that the embodiment of the invention described here be interpreted as being illustrative and not limitative of the invention, and, accordingly, that the invention be accorded an interpretation consistent with the spirit and scope of its broad principles.

What is claimed is:

1. An arrangement of circuit elements comprising a source of unidirectional voltage, means including semiconductive paths for switching the direction in which a current derived from said source is delivered through a pair of output terminals of said switching means with a given frequency of alternation, and reactance means for substantially blocking what would otherwise be harmonic components of said delivered current and for limiting the amplitude of said delivered current.

2. An arrangement of circuit elements comprising a source of alternating voltage, means for rectifying the alternating voltage of said source to provide a unidirectional voltage, means including semiconductive paths for switching the direction in which a current derived from energy transmitted through said rectifying means from said source is delivered through a pair of output terminals of said switching means with a frequency of alternation that is converted in value from the value of the frequency of the alternating voltage of said source, means for substantially blocking what would otherwise be harmonic components of said delivered current, and reactance means for multiplying the voltage appearing across said output terminals in accompaniment with said current delivered through said output terminals and for limiting the amplitude of said current.

3. An arrangement of circuit elements comprising a source of unidirectional voltage, means for switching the direction in which a current derived from energy of said source is delivered through a pair of output terminals of said switching means with a predetermined frequency of alternation, means for filtering said current to limit the same substantially only to fundamental content, and means for multiplying the voltage appearing across said output terminals in accompaniment with said current delivered through said output terminals for at least a pair of discharge lamps, a capacitor connected in series between one of said lamps and said multiplying means and an inductor connected in series between the other of said lamps and said multiplying means, said capacitor and said inductor having respective values such that first and second currents delivered to said lamp, respectively, from said multiplying means are limited in amplitude and are so phased as substantially to provide unity circuit power factor.

4. An arrangement of circuit elements comprising a source of unidirectional voltage, means including semiconductive paths for switching the direction in which a current derived from energy of said source is delivered through a pair of output terminals of said switching means with a predetermined frequency of alternation, means for substantially blocking what would otherwise be harmonic components of said delivered current, and reactance means for multiplying the voltage appearing across said output terminals in accompaniment with said current delivered through said output terminals and for limiting the amplitude of said current.

5. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a first frequency of alternation that is converted in value from the value of the frequency of the alternating voltage of said source, and a combination of capacitors and inductors serially connected in a path between said output terminals at least to limit the amplitude of said current and to provide facile passage of said current with said first frequency but to block substantially what would otherwise be components of said delivered current with harmonic frequencies, whereby load apparatus energized from said output terminals can be operated with said first frequency which characterizes said load apparatus with an increased operational efficiency.

6. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a first frequency of alternation that is converted in value from the value of the frequency of the alternating voltage of said source, a first circuit element combination being resonant at said first frequency and serially connected in a path between said output terminals at least to provide facile passage of said current with said first frequency but to block substantially what would otherwise be components of said delivered current with harmonic frequencies, means connected in said path for multiplying the voltage appearing across said output terminals in accompaniment with said current delivered through said output terminals, and a second circuit element combination connected in series with the output of said multiplying means to provide a predetermined amount of impedance for limiting the amplitude of output current of said multiplying means, whereby load apparatus energized from said multiplying means can be operated with said first frequency to characterize said load apparatus with increased operational efficiency.

7. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a first frequency of alternation that is converted in value from the value of the frequency of the alternating voltage of said source, means for substantially blocking what would otherwise be harmonic components of said delivered current, a transformer having a primary portion thereof serially connected in a path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said first frequency to characterize said lamps with an increased operational efficiency.

8. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a first frequency of alternation that is converted in value from the value of the frequency of the alternating voltage of said source, a first capacitor and a first inductor serially connected in a path between said output terminals and being cooperatively resonant at said first frequency to provide at least facile passage of said delivered current with said first frequency but to block substantially what would otherwise be components of said current at harmonic frequencies, a transformer having a primary portion thereof serially connected in said path between said output terminals, said transformer having a secondary portion to provide a multiplied voltage for at least one pair of discharge lamps, a second capacitor connected in series between one of said lamps and said secondary portion of said transformer and a second inductor connected in series between the other of said lamps and said secondary portion of said transformer, said second capacitor and said second inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said first frequency to characterize said lamps with an increased operational efficiency.

9. An arrangement of circuit elements comprising a source of unidirectional voltage, means for switching the direction in which a current derived from energy of said source is delivered through a pair of output terminals of said switching means with a predetermined frequency of alternation, means for blocking what would otherwise be harmonic components of said delivered current, a transformer having a primary portion thereof serially connected in a path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said predetermined frequency to characterize said lamps with an increased operational efficiency.

10. An arrangement of circuit elements comprising a source of unidirectional voltage, means for switching the direction in which a current derived from energy of said source is delivered through a pair of output terminals of said switching means with a predetermined frequency of alternation, a first capacitor and a first inductor serially connected in a path between said output terminals and being cooperatively resonant at said predetermined frequency to provide at least facile passage of said delivered current with said predetermined frequency but to block substantially what would otherwise be components of said current with harmonic frequencies, a transformer having a primary portion thereof serially connected in said path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said predetermined frequency to characterize said lamps with an increased operational efficiency.

11. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a frequency of alternation that is converted in value from the value of the frequency of the alternating voltage of said source, a capacitor shunting the output of said rectifying means to prevent feedback currents having converted frequencies from flowing from said switching means through said rectifying means, means for substantially blocking what would otherwise be harmonic components of said delivered current, and means for multiplying the voltage appearing across said output terminals in accompaniment with said current delivered through said output terminals and for limiting the amplitude of said current.

12. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a first frequency of alternation that is converted in value from the value of the frequency of the alternating voltage of said source, a capacitor shunting the output of said rectifying means to prevent feedback currents having converted frequencies from flowing from said switching means through said rectifying means, a first capacitor and a first inductor serially connected in a path between said output terminal and being cooperatively resonant at said first frequency to provide at least facile passage of said delivered current with said first frequency but to block substantially what would otherwise be components of said current at harmonic frequencies, a transformer having a primary portion thereof serially connected in said path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said first frequency to characterize said lamps with an increased operational efficiency.

13. An arrangement of circuit elements comprising a source of alternating voltage, means for rectfiying the alternating voltage of said source to provide a unidirectional voltage, means for switching the direction in which a current derived from energy transmitted through said rectifying means from said source is delivered through a pair of output terminals of said switching means with a frequency of alternation that is converted in value from the value of the frequency of the alternating voltage of said source, said switching means including first and second paths, the opposite ends of each of said first and said second paths terminating with said output terminals, respectively, at least one semiconductive switch element included in each of said first and said second paths, and third means for controlling the condition of conductivity of each of said semiconductive elements and for controlling the rate at which said semiconductive elements alternate between conductive and nonconductive conditions so that said first and said second paths are alternately conductive to provide said current with said frequency, said first and said second paths having a serially connected circuit element combination being resonant at said frequency at least to provide facile passage of said current with said frequency but to block what would otherwise be components of said current with harmonic frequencies, a transformer having a primary portion thereof serially connected in a third path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said first frequency to characterize said lamps with an increased operational efficiency.

14. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a frequency of alternation that is converted in value from the value of the frequency of the alternating voltage of said source, said switching means including first and second paths, the opposite ends of each of said first and said second paths terminating with said output terminals, respectively, at least one transistor device included in each of said first and said second paths, each of said transistor devices having emitter, collector and base electrodes, the emitter and collector electrodes of each of said transistor devices being included serially in said first and said second paths, respectively, an electromagnetic induction device having a primary winding and a plurality of secondary windings, said secondary windings being connected between the base and the emitter electrodes of said transistor devices, respectively, for controlling the conductivity of said transistor devices in said first and said second paths, respectively, said primary winding of said transformer being energizable in each of opposite directions, and means for controlling the direction of energization of said primary winding and the rate at which said direction of energization alternates so that said first and said second paths are alternately conductive to provide said current with said frequency, said first and said second paths having a serially connected circuit element combination being resonant at said frequency at least to provide facile passage of said current with said frequency but to block what would otherwise be components of said current with harmonic frequencies, a transformer having a primary portion thereof serially connected in a third path between said output terminals, said transformer having a secondary portion to provide a multiplied voltage for at least one pair of discharge lamps, a capacitor connected in series between one of said lamps and said secondary portion of said transformer and an inductor connected in series between the other of said lamps and said secondary portion of said transformer, said capacitor and said inductor having respective values such that first and second currents delivered to said lamps from said secondary portion of said transformer, respectively, are limited in amplitude and such that the current through said secondary portion of said transformer is substantially in phase with said multiplied voltage across said secondary portion, whereby said lamps can be energized with said first frequency to characterize said lamps with an increased operational efficiency.

15. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a frequency of alternation that is converted in value from the value of the frequency of the alternating voltage of said source, said switching means including first and second paths, the opposite ends of each of said first and said second paths terminating with said output terminals, respectively, at least one semiconductive switch element included in each of said first and said second paths, an electromagnetic induction device having a primary winding and a plurality of secondary windings, said secondary windings being connected with said semiconductive elements, respectively, to control the conductivity of said semiconductive elements in said first and said second paths, respectively, said primary winding of said transformer being energizable in each of opposite directions, a combination of circuit elements being resonant at said frequency and being serially connected with said primary winding of said induction device in a third path including said rectifying means, said combination of circuit elements and said primary winding being energized first in one direction from said rectifying means to maintain the semiconductive element in said first path in a conductive condition and the semiconductive element in said second path in a nonconductive condition, said combination of circuit elements then discharging stored energy through said primary winding in another direction opposite said one direction to maintain the semiconductive element in said first path in a nonconductive condition and the semiconductive element in said second path in a conductive condition, the rate at which the direction of energization of said primary winding alternates in direction being said frequency so that said first and said second paths are alternately conductive to provide said current with said frequency, said first and said second paths having a serially connected circuit element combination being resonant at said frequency at least to provide facile passage of said current with said frequency but to block what would otherwise be components of said current with harmonic frequencies, and means for multiplying the voltage appearing across said output terminals in accompaniment with said current delivered through said output terminals and for limiting the amplitude of said current.

16. An alternating current output means comprising in combination a conductible switching means oppositely biasable to conduct current in reversible directions therethrough, means for connecting said switching means to a source of substantially unidirectional potential, circuit means for applying biasing potentials of successively opposite polarity to said switching means to induce an alternating current output from said switching means, said circuit means including a tuned circuit for controlling the application of said biasing potentials to determine a fundamental frequency of said output current, and means for limiting said output current including a tunable filtering circuit coupled to the output of said switching means, said filtering circuit being tuned to said fundamental frequency.

17. An arrangement of circuit elements comprising a source of alternating voltage, means for rectifying the alternating voltage of said source to provide a unidirectional voltage, means for switching the direction in which a current derived from energy transmitted through said rectifying means from said source is delivered through a pair of output terminals of said switching means with a frequency of alternation that is converted in value from the value of the frequency of the alternating voltage of said source, said switching means including first and second paths, the opposite ends of each of said first and said second paths terminating with said output terminals, respectively, at least one semiconductive switch element included in each of said first and said second paths, means for controlling the conductivity of each of said semiconductive elements, said controlling means including a combination of circuit elements being resonant at said frequency and being connected in a third path including said rectifying means so that said first and said second paths are alternately conductive to provide said current with said frequency, said first and said second paths having a serially connected circuit element combination being resonant at said frequency to provide facile passage of said current with said frequency but to block what would otherwise be components of said current with harmonic frequencies and to provide stored energy releasable through one of said one and said second paths, and means for multiplying the voltage appearing across said output terminals in accompaniment with said current delivered through said output terminals and for limiting the amplitude of said current.

References Cited in the file of this patent

UNITED STATES PATENTS

| | | |
|---|---|---|
| 2,284,407 | Edwards | May 26, 1942 |
| 2,300,916 | Furedy | Nov. 3, 1942 |
| 2,783,384 | Bright et al. | Feb. 26, 1957 |
| 2,854,582 | Guyton | Sept. 30, 1958 |
| 2,872,582 | Norton | Feb. 3, 1959 |
| 2,874,293 | McMurren | Feb. 17, 1959 |
| 2,892,125 | Warner et al. | June 23, 1959 |